United States Patent [19]

Wolf et al.

[11] Patent Number: 4,726,686

[45] Date of Patent: Feb. 23, 1988

[54] SWIRL CHAMBER

[76] Inventors: Hartmut Wolf, Schwimmbadstrasse 11, 6145 Lindenfels 2; Norbert Czernawski, Lessingstrasse 21, 6140 Benzheim 3, both of Fed. Rep. of Germany

[21] Appl. No.: 888,807

[22] Filed: Jul. 24, 1986

[30] Foreign Application Priority Data

Jul. 30, 1985 [DE] Fed. Rep. of Germany ... 8521902[U]
Jul. 30, 1985 [DE] Fed. Rep. of Germany ... 8521904[U]

[51] Int. Cl.$^4$ ............................................. E01D 17/038
[52] U.S. Cl. ..................................... 366/165; 209/144; 209/211; 210/512.1
[58] Field of Search .................. 209/211, 139, 144; 261/79 R, 79 A; 210/512.1, 512.2; 55/459 R, 419, 454; 366/150, 177, 165

[56] References Cited

U.S. PATENT DOCUMENTS

2,653,801 9/1953 Fontein et al. ................... 209/144
4,244,708 1/1981 Bielefeldt ........................ 209/144

*Primary Examiner*—Frank Sever
*Attorney, Agent, or Firm*—Howard C. Miskin

[57] ABSTRACT

A swirl chamber comprises a housing, which at its shell or side wall is connected to at least one tubular port having a center line which is approximately at right angles to and spaced from the axis of the housing. In the improved swirl chamber at least two tubular ports extend through the shell or side walls and with respect to radii of said housing which intersect said ports at their inner ends are inclined in the same sense in a peripheral direction of the housing, the housing is closed at opposite ends by end plates or end walls, which are intersected by the axis of the housing, and an inlet nozzle is provided in one end plate and a discharge tube in the other.

18 Claims, 14 Drawing Figures

SWIRL CHAMBER

BACKGROUND OF THE INVENTION

1. Field of the Invention

This invention relates to a swirl chamber comprising a housing, which at its shell or side wall is connected to at least one tubular port having a center line which is approximately at right angles to and spaced from the axis of the housing.

2. Description of the Prior Art

In various known swirl chambers of said kind the tubular port constitutes an inlet port by which a swirling motion is imparted to the fluid entering the swirl chamber, such as liquid or gas, so that solid particles contained in said fluid will be thoroughly dispersed in or centrifugally separated from said fluid as in a cyclone.

SUMMARY OF THE INVENTION

It is an object of the invention to provide a swirl chamber which is of the kind described first hereinbefore and in which the entering fluid can be caused to form a convergent vortex which has a high rotational energy and leaves said chamber as a centered jet.

In a swirl chamber of the kind described first hereinbefore that object is accomplished in accordance with the invention in that at least two tubular ports extend through the shell or side walls and with respect to radii of said housing which intersect said ports at their inner ends are inclined in the same sense in a peripheral direction of the housing, the housing is closed at opposite ends by end plates or end walls, which are intersected by the axis of the housing, and an inlet nozzle is provided in one end plate and a discharge tube in the other.

When a gaseous or liquid fluid entering through the ports is sucked through the discharge tube or if such fluid is supplied to the ports under pressure, a swirl motion will be imparted to said fluid in the swirl chamber in accordance with the invention and said fluid will form a vortex because the tubular ports are inclined in the same sense. In said vortex the angular velocity of the fluid will increase as the axis of rotation is approached. In the swirl chamber in accordance with the invention the fluid which is sucked through the ports or is supplied in them under pressure is formed into a swirling jet, which centers itself on the axis of the swirl chamber housing and exits from the discharge tube as a convergent jet. That concentrated swirling jet has a high rotational energy and can be used for various purposes, as will be explained more in detail hereinafter.

For instance, fuel may be injected into the swirl chamber through the inlet nozzle and will be entrained and atomized to form very fine particles by the vortex. Such a swirl chamber can be used as a carburetor of an internal combustion engine or as an atomizer associated with a burner or a jet engine. Fuel can be supplied through the inlet nozzle in the form of a liquid or powder, e.g. as pulverized coal.

If dust-laden air enters the swirl chamber through the tubular ports, said air can be purified in that the dust particles are agglomerated by means of water that is injected through the inlet nozzle and the agglomerates may subsequently be removed by centrifugal separation.

The entraining fluid may be supplied through the inlet nozzle under pressure or may be sucked by a vacuum maintained in the swirl chamber.

The inlet nozzle may be omitted under certain circumstances, for instance, if different fluids are supplied though the tubular ports and are mixed in the vortex formed by said fluids. The tubular ports may be so arranged that different components supplied through said ports will remain substantially seaparated in the swirling vortex.

A vortex will be formed in the swirl chamber in accordance with the invention and will be centered on the axis of said chamber and the angular velocity of said vortex may theoretically increase to an infinitely high angular velocity as the axis of the vortex is approached. As a result, there will be a friction between the swirling particles or even molecules adjacent to the axis of the vortex. Said friction will result in an atomization of the particles of molecular size and may possibly result in a destruction of molecular bonds in the swirling substance.

Whereas the swirl chamber may be square or polygonal in cross-section, the shell of the swirl chamber is suitably cylindrical. In such a drumlike swirl chamber the power losses due to friction are believed to be minimized. The shell of the swirl chamber may be conical and may converge toward the discharge tube so that the shell substantially conforms to the vortex being formed in the swirl chamber.

The center lines of the inlet nozzle and of the discharge tube are suitably aligned with the axis of the housing.

The tubular ports are suitably distributed with a regular angular spacing around the side walls or the shell.

The center lines of the tubular ports suitably include equal angles with radial lines intersecting the axis of the housing so that the vortex being formed will be as uniform as possible. On the other hand, different angles may be selected if different effects are desired.

The tubular ports suitably extend through the shell of the housing in an approximately tangential direction because this will promote the formation of an effective vortex.

The center lines of the tubular ports may be disposed in a common center plane, which intersects the axis of the housing and which desirably constitutes the transverse center plane of the housing.

The flow of the entering fluids in streams which rotate relative to each other will be promoted if the center lines of the tubular ports are disposed in transverse planes which are spaced apart. The center lines of the tubular ports may be oblique relative to the discharge tube and their projections on the axis of the housing may include equal acute angles with said axis. Such an arrangement of the tubular ports may be desirable if the fluid entering through said ports is not sucked through the discharge tube but is supplied to said ports under pressure. It is desirable to provide only two tubular ports.

In accordance with a further feature which is desired to be independently patented, the discharge tube constitutes an entrance tube, which opens into a succeeding chamber, which is provided with an exit tube, which is approximately coaxial to the entrance tube, the inner ends of the entrance and exit tubes are spaced apart, walls of said succeeding chamber are spaced around said inner ends, and the succeeding chamber is provided with an outlet or with an extracting tube, which is disposed radially outwardly of the entrance and exit tubes. The succeeding chamber which surrounds the inner ends of the entrance and exit tubes constitutes a centrifuging chamber for receiving a jet which rotates at high speed and is conducted through the entrance and exit tubes and between the inner ends of said tubes passes freely through said centrifuging chamber. As a result, a stationary vortex is formed in said centrifuging chamber between the inner ends of the entrance and exit tubes and relatively large and/or relatively heavy particles disposed near the periphery of said vortex will be centrifugally separated.

If the swirl chamber in accordance with the invention is used as a carburetor of an internal combustion engine or as an atomizer associated with a burner or the like, the provision of the centrifuging chamber in accordance with the invention will be essential for a trouble-free function and an effective operation because liquid particles which would otherwise deposit on the walls can now be centrifugally separated and withdrawn so that they cannot clog the apparatus or accumulate therein as a sludge. Besides, the combustion will be improved so that the toxic content of the exhaust gas will be decreased.

If the swirl chamber in accordance with the invention is used, e.g., to purify air and water or another liquid for wetting dust particles is injected through the inlet nozzle, the wetted dust particles and/or liquid droplets, which may contain absorbed gases to be removed by scrubbing, will be centrifugally separated in the centrifuging chamber and will then be withdrawn from said chamber through the outlet.

The diameter of the centrifuging chamber should be so selected that an unconfined stationary vortex can form in the centrifuging chamber between the inner ends of the entrance and exit tubes so that said vortex will not be braked by a frictional contact with the wall of the centrifuging chamber.

The walls of the centrifuging chamber are desirably rotationally symmetrical with respect to the longitudinal axis of the centrifuging chamber and said longitudinal axis is aligned with the center lines of the entrance and exit tubes. For instance, the centrifuging chamber may be pear-shaped and the exit tube may be provided at the end of the slender portion.

That cross-section of the centrifuging chamber which is largest in diameter is desirably disposed in a plane extending between the inner ends of the entrance and exit tubes.

In accordance with a further feature of the invention at least one of the entrance and exit tubes is mounted to be axially displaceable in an opening of the centrifuging chamber so that the distance between the inner ends of said tubes can be changed. The width and length of the vortex forming in the centrifuging chamber can be changed by a change of the distance between the inner sides of said tubes and the rate at which particles are centrifugally separated from the stationary vortex can also be influenced by such change. For instance, if the centrifuging chamber is incorporated in a carburetor, the richness of the fuel-air mixture can be adjusted by a change of the distance between the inner ends of the tubes.

If the centrifuging chamber is used to remove particles having a predetermined specific gravity or a predetermined size, the entrance tube may be correspondingly larger in diameter than the exit tube.

The shape of the vortex forming in the centrifuging chamber may be improved in that the inner end portion of the entrance tube is flared like a nozzle.

In accordance with a further feature of the invention a plurality of centrifuging chambers of the same kind are connected in series and the exit tube of each preceding centrifuging chamber constitutes the entrance tube of the next succeeding chamber. Such an arrangement permits a selective centrifugal separation of particles in dependence on specific gravity and/or size. The diameters of the exit tubes of the consecutive chambers desirably increase from chamber to chamber in the direction of flow.

The swirl chamber in accordance with the invention can be used alone or in combination with the centrifuging chamber in accordance with the invention to provide a carburetor or an air purifier or to provide a humidifier if water for humidifying the air is supplied through the inlet nozzle.

The swirl chamber in accordance with the invention and the centrifuging chamber in accordance with the invention can be used individually and preferably in combination to provide an oil burner, a burner for pulverized coal or a burner for pulverized wood or to provide an absorber for soot or a dust collector. They may also be used in clarifiers or in refining systems. The apparatus in accordance with the invention may be used to produce and to segregate emulsions and mixtures.

DETAILED DESCRIPTION OF THE PREFERRED EMBODIMENTS

Illustrative embodiments of the invention will now be described in more detail with reference to the drawing.

The swirl chamber 1 shown in FIGS. 1 to 4 comprises a cylindrical tubular body 2, which is closed at opposite ends by end plates 3, 4 joined to the tubular body 2. The tubular member 2 constitutes the shell of the housing of the swirl chamber 1. Two tubular ports 5, 6 are joined to the tubular body 2 in its transverse center plane at locations which are spaced 180° apart. As is apparent from FIG. 2, the tubular ports 5, 6 open tangentially into the swirl chamber. Because the tubular ports 5, 6 are spaced 180° apart, their center lines 7, 8 are parallel to each other. As is apparent from FIG. 1 the center lines 7, 8 of the tubular ports 5, 6 intersect the center line 10 of the swirl chamber 1 at right angles thereto.

Figure 1:
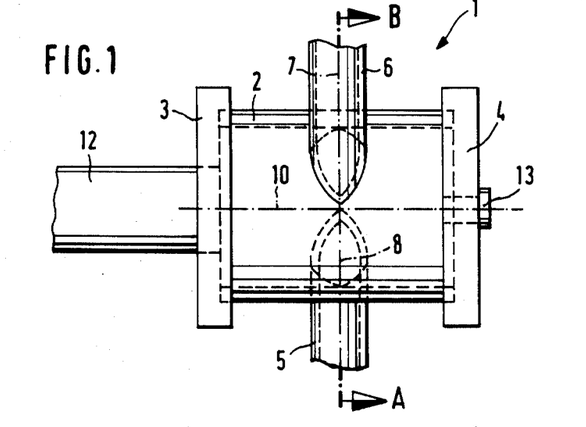
FIG. 1 is a side elevation showing the swirl chamber.
Figure 2:
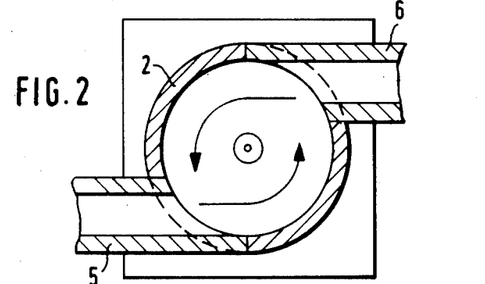
FIG. 2 is a sectional view taken on line A-B in FIG. 1.
Figure 3:
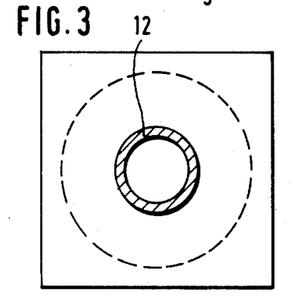
FIG. 3 is a top plan view showing that end of the swirl chamber of FIG. 1 where the discharge tube is provided.
Figure 4:
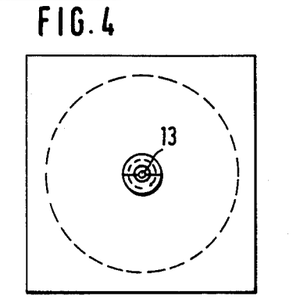
FIG. 4 is a top plan view showing that end of the swirl chamber of FIG. 1 where the inlet nozzle is provided.

The end plate 3 of the swirl chamber 1 is provided with the discharge tube 12. The inlet nozzle 13 is mounted in the opposite end plate 4. The center lines of the discharge tube 12 and of the inlet nozzle 13 are aligned with the center line of the housing of the swirl chamber.

Figure 5:
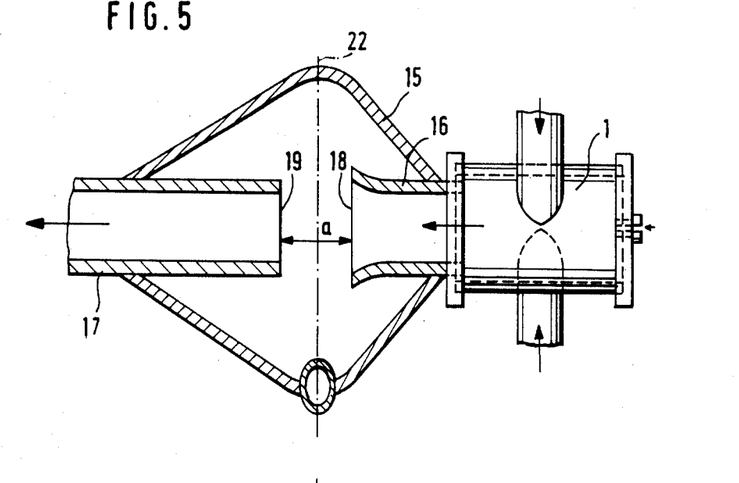
FIG. 5 is a longitudinal sectional view showing a centrifuging chamber which succeeds the swirl chamber of FIG. 1.
Figure 6:
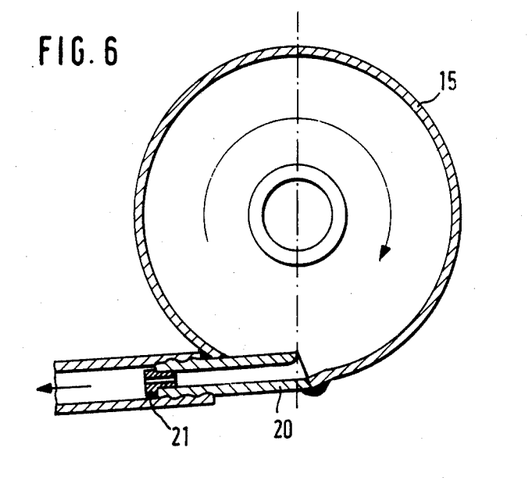
FIG. 6 is a transverse sectional view showing the centrifuging chamber of FIG. 5.

The centrifuging chamber will now be explained with reference to FIGS. 5 to 7. That chamber comprises a housing 15, which is rotationally symmetrical and approximately pear-shaped. The housing 15 is provided at one end with an entrance tube 16 and at the other end with an exit tube 17. The entrance and exit tubes 16 and 17 are concentric and centered on the center line of the centrifuging chamber 15 and are tightly fitted in mating openings formed in the ends of said chamber. The entrance tube 16 is constituted by the discharge tube of the swirl chamber 1.

In the interior of the centrifuging chamber 15 the inner ends 18, 19 of the entrance tube 16 and the exit tube 17, respectively, are spaced a predetermined distance a apart. That cross-section 20 of the centrifuging chamber 15 which is largest in diameter is disposed in a plane extending between the inner ends 18, 19 of the tubes 16, 17. In that portion which is largest in diameter, the centrifuging chamber 15 has a curved contour in longitudinal section. The centrifuging chamber 15 decreases in diameter from that portion toward the entrance tube 16 and toward the exit tube 17 and has a smaller diameter at the entrance tube 16 than at the exit tube 17.

Adjacent to that cross-section which is largest in diameter, the centrifuging chamber 15 is provided with an approximately tangentially extending extracting pipe 20, which may incorporated a valve or construction 21.

Figure 7:
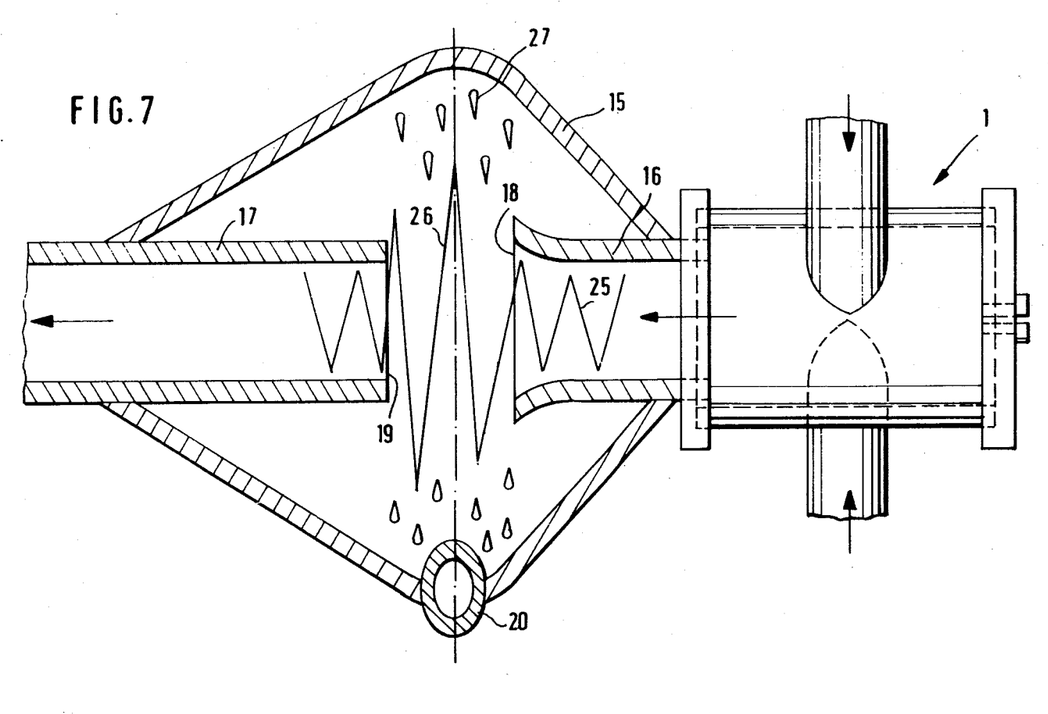
FIG. 7 is a longitudinal sectional view which is similar to FIG. 1 but drawn to a larger scale.

With reference to FIG. 7, a swirling jet 25 entering the centrifuging chamber 15 through the entrance tube 16 can widen between the inner ends 18, 19 of the tubes 16, 17 to form a vortex 26, which is larger in diameter. Particles 27 disposed in the vortex near its circumference will be centrifugally separated and can be withdrawn through the extracting pipe 20.

Some applications of the apparatus shown in FIGS. 1 to 7 will now be explained by way of example with reference to FIGS. 8 to 14.

Figure 8:
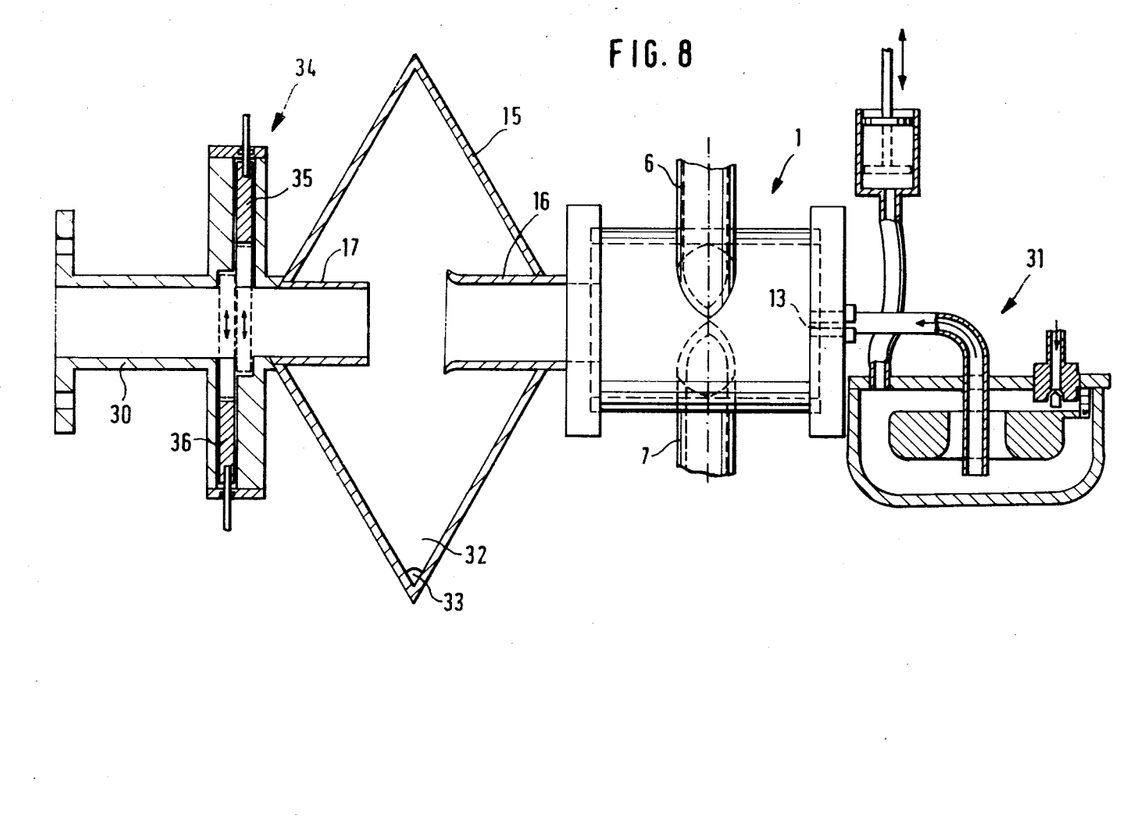
FIG. 8 is a longitudinal sectional view showing a carburetor for an internal combustion engine, which carburetor comprises a swirl chamber and a succeeding centrifuging chamber.

FIG. 8 shows a single swirling carburetor comprising the swirl chamber 1 and the centrifuging chamber 15 connected to the swirl chamber 1. An internal combustion engine sucks a fuel-air mixture through a pipe 30 so that a vacuum is produced in the swirl chamber 1 and causes air to flow through the tubular ports 6, 7, into the swirl chamber 1, in which said air forms a convergent vortex. Fuel is supplied by a fuel feeder 31 through the nozzle 13 into the swirling convergent air jet and is atomized to form very small particles in the swirling air jet.

The swirling fuel-air jet then flows through the entrance tube 16 into the centrifuging chamber 15, in which relatively large liquid droplets are centrifugally separated and are collected in that portion 32 in which the centrifuging chamber 15 is largest in diameter and from which said droplets are discharged through the extraction pipe 33. The fuel which has thus been extracted is then recycled by lines which are not shown and is fed once more through the nozzle 13.

The exit tube 17 contains a throttle valve 34 for infinitely adjusting the flow area at the exit end of the exit tube 34. In the embodiment illustrated by way of example the throttle valve comprises two gates 35, 36, which are formed with overlapping V-shaped identations, which define a square opening, and the gates can be displaced relatively to each other to vary the area of said opening. The throttle valve may alternatively be constituted by an iris diaphragm.

Figure 9:
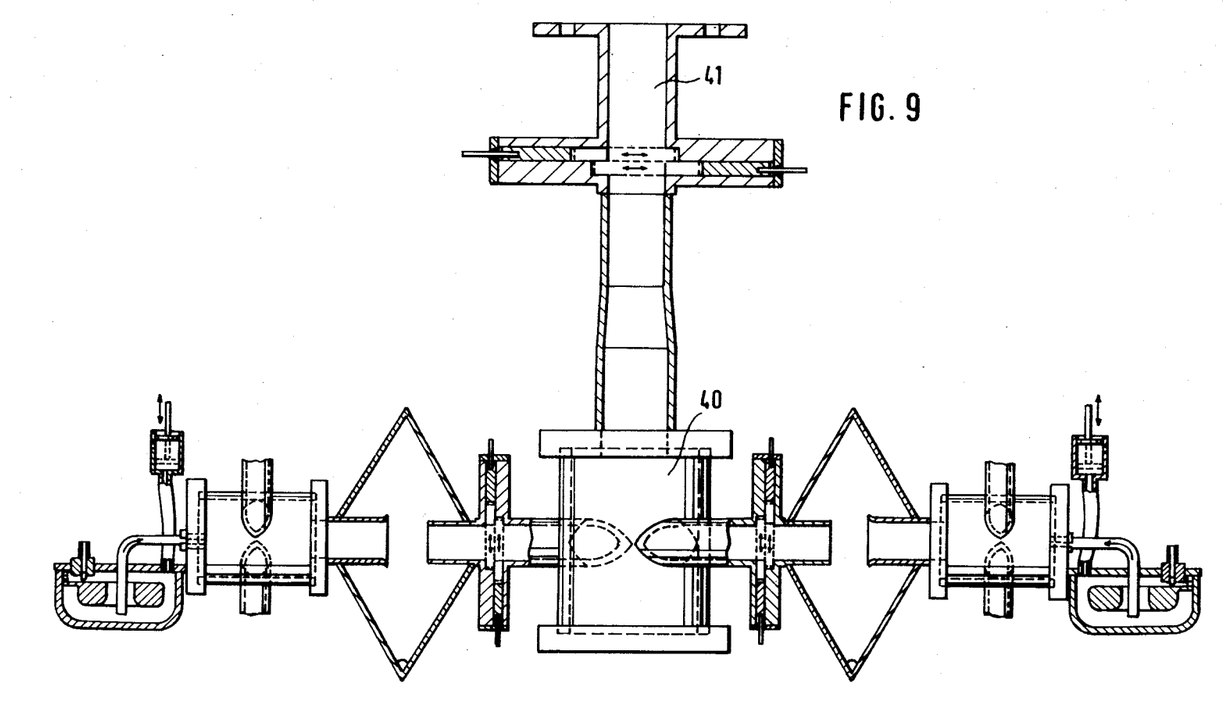
FIG. 9 is a longitudinal sectional view showing a twin vortex carburetor.

FIG. 9 shows a twin swirling carburetor, in which two swirling carburetors of the kind described with reference to FIG. 8 are connected to a succeeding additional swirl chamber 40, from which the fuel-air mixture forming a swirling jet is sucked through the suction tube 41.

Figure 10:
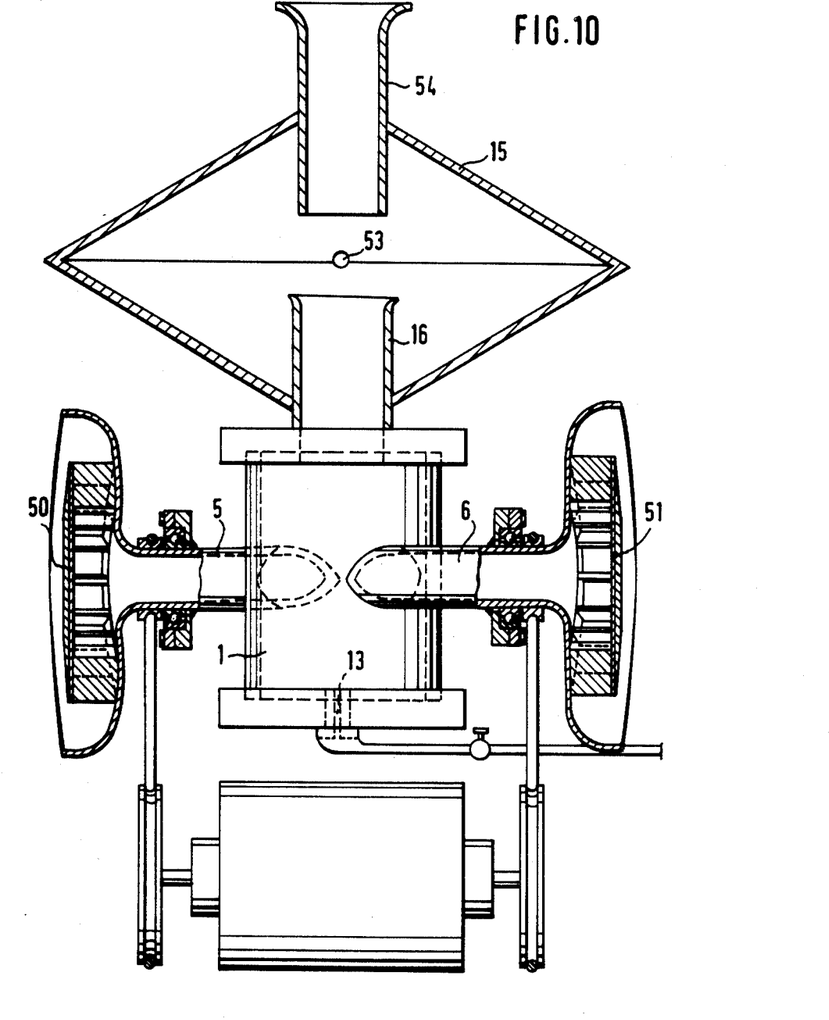
FIG. 10 is a longitudinal sectional view showing an oil burner.

FIG. 10 shows the concept of an oil burner comprising two radial fans 50, 51, which blow air into the swirl chamber 1 through the tubular ports 5, 6. Fuel is injected through the nozzle 13 and is atomized in the vortex of air and the resulting fuel-air jet enters the centrifuging chamber 15 through the tube 16. Centrifugally separated fuel droplets are extracted through extracting pipe 53 and are recycled. The swirling fuel-air jet is supplied to the burner through a pipe 54.

Figure 11:
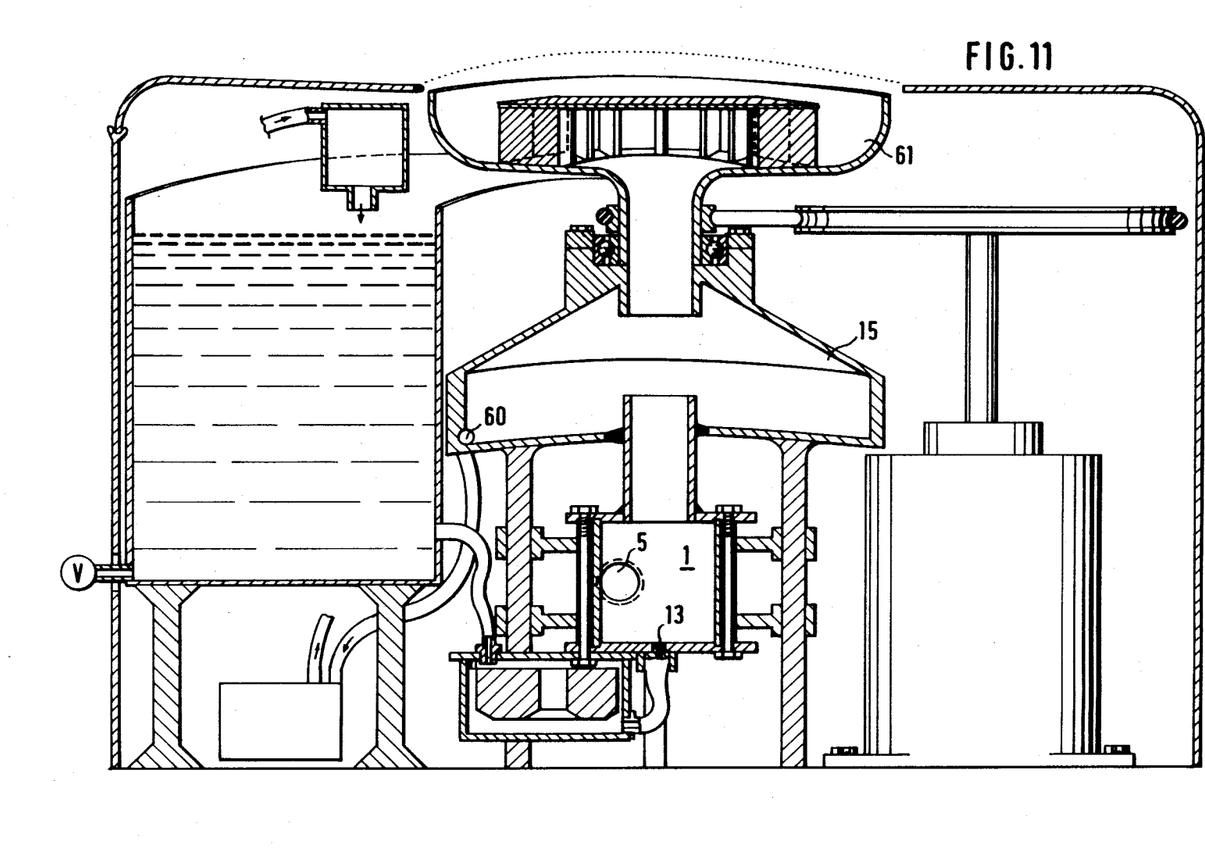
FIG. 11 is a transverse sectional view showing a system for humidifying and purifying air and for collecting dust.

FIG. 11 is a diagrammatic view showing a system for humidifying and purifying air and for collecting dust. Air to be conditioned enters the swirl chamber through the tubular intake ports, only one of which, designated 5, is apparent in the sectional view. Water is supplied through nozzle 13 to the air which is to be purified and humidified. The water is atomized in the swirling air jet to form very fine particles and the resulting water-air aerosol enters the centrifuging chamber 15, in which dust particles that have been agglomerated by the injected water are centrifugally separated and subsequently extracted through the extracting duct 60. The air which has been humidified and purified is sucked and discharged by the fan 61.

Figure 12:
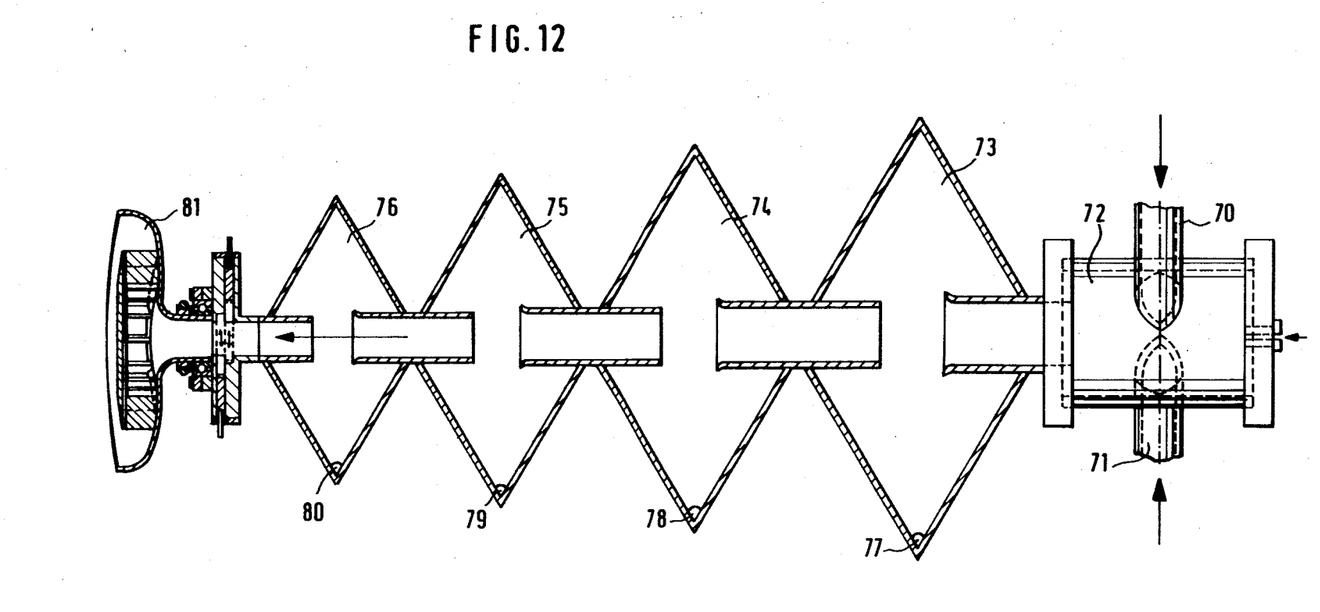
FIG. 12 is a diagrammatic longitudinal sectional view showing a clarifier.

FIG. 12 is a diagrammatic view showing a clarifier or a system for recovering water of high purity. The water to be purified enters the swirl chamber 72 through the tubular ports 70, 71. Heavy particles to be removed are centrifugally separated in the succeeding centrifuging chambers 73 to 76 and are extracted through the extracting lines 77 to 80. The water to be purified is sucked by a centrifugal pump 81.

The swirling jet produced in the swirl chamber 72 is still present in the exit tube of the last centrifuging chamber 76 in the direction of flow. Because the diameters of the exit tubes of the centrifuging chambers progressively decrease in the direction of flow, the substances to be removed are selectively removed in respective centrifuging chambers.

Figure 13:
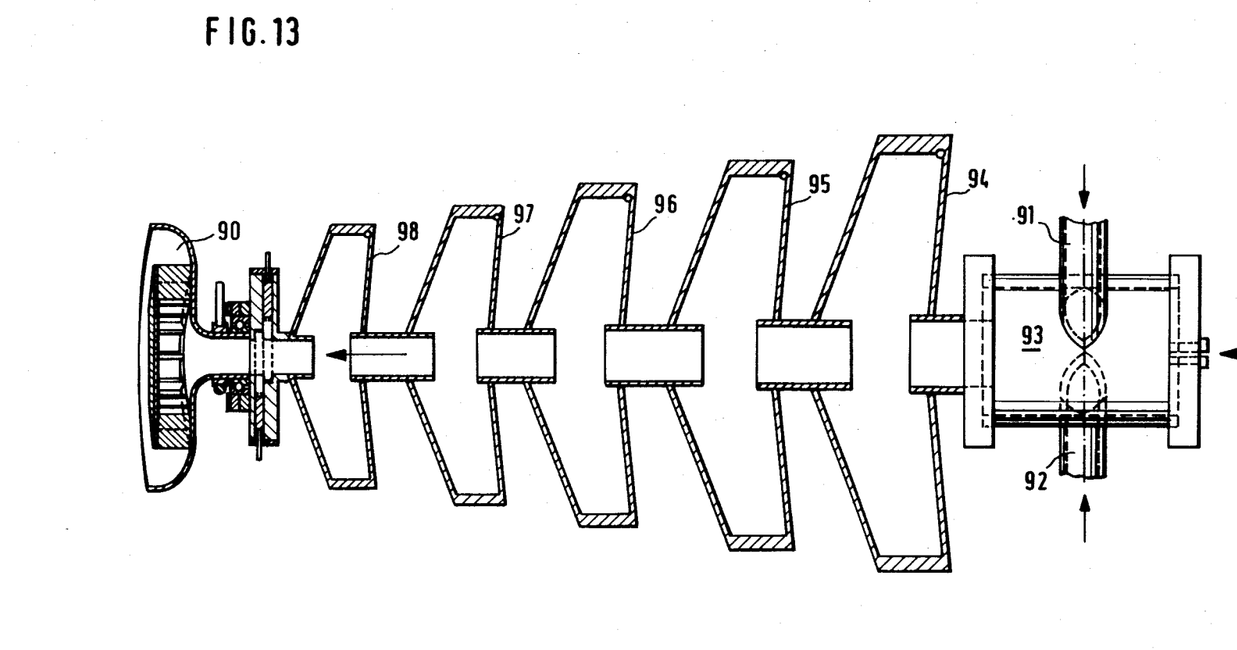
FIG. 13 is a diagrammatic longitudinal sectional view showing a refining plant.

FIG. 13 is a diagrammatic view showing a refining system. The liquid to be purified is sucked by the centrifugal pump 90 and enters the swirl chamber 93 through the tubular ports 91, 92. The substances to be removed are selectively separated in the centrifuging chambers 94 to 98.

Figure 14:
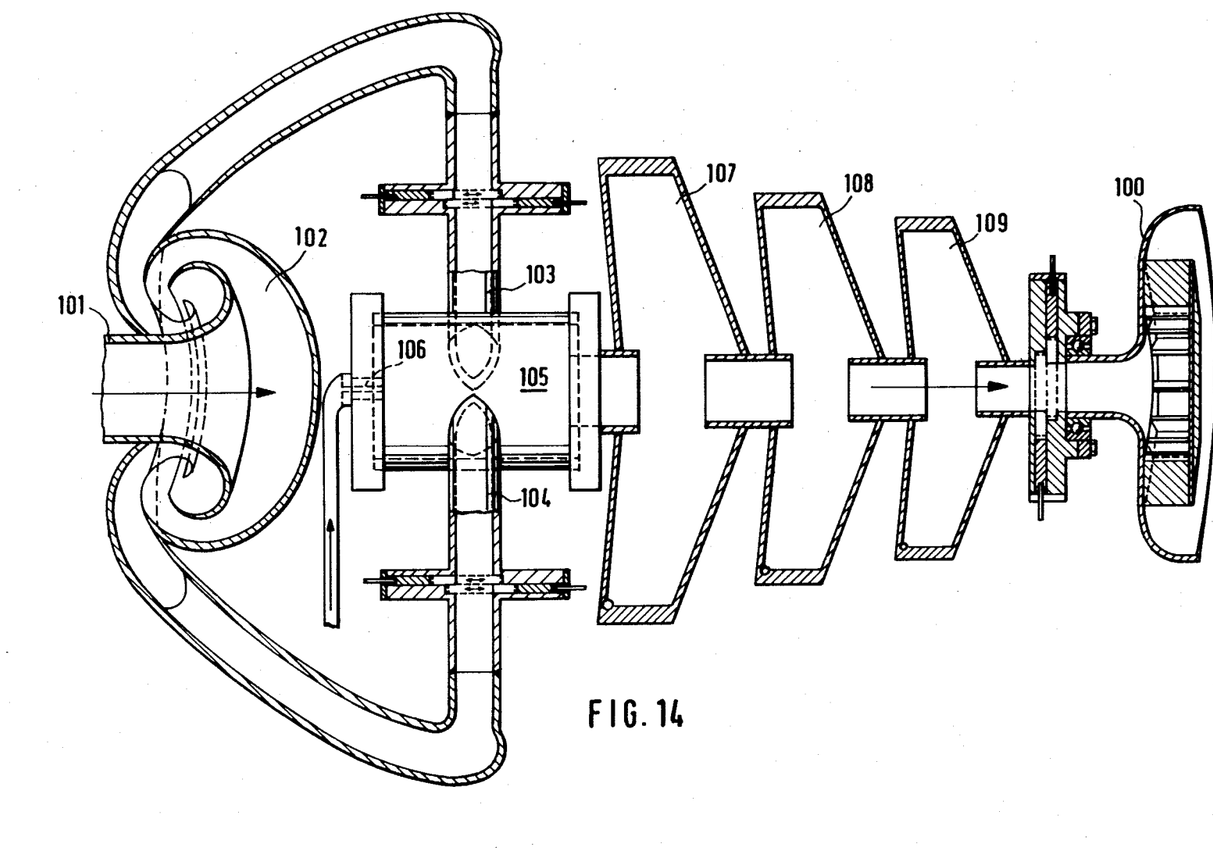
FIG. 14 is a diagrammatic longitudinal sectional view showing a flue gas detoxicating system.

FIG. 14 is a diagrammatic view showing a swirling absorber for detoxicating flue gases. The flue gas to be purified is sucked by the fan 100 and through the intake tube 101 enters a cyclone chamber 102, in which coarse dust particles are centrifugally separated. The flue gas is then sucked through the tubular ports 103, 104 and through adjustable throttle valves enters the swirl chamber 105. A liquid preferably consisting of water is injected through the nozzle 106 and causes dust to agglomerate and absorbs gases which are to be removed. Those constituents of the flue gas what are to be removed are selectively separated in the succeeding centrifuging chambers 107 to 109 so that a purified detoxicated flue gas is discharged by the fan 100.

What is claimed is:

1. An apparatus comprising: means for dispersing a dispersant material in a fluid and removing dispersant material therefrom having a particle dimension exceeding a predetermined value including, a swirl chamber including a peripheral wall and opposite first and second end walls;

a dispersant material feed conduit communicating with said swirl chamber through said first end wall;

a fluid feed conduit communicating with said swirl chamber through a port in said swirl chamber peripheral wall and at an angle having a component tangential to said swirl chamber whereby to import rotation to fluid entering said swirl chamber through said fluid feed conduit;
   - a centrifuging chamber axially spaced from and approximately coaxial with said swirl chamber and including a peripheral wall;
   - a connecting conduit approximately coaxial with said chambers and extending from and communicating with said swirl chamber through said second end wall and projecting into said centrifuging chamber and terminating in an open inner end;
   - a first discharge conduit approximately coaxial with said connecting conduit and having an inner end axially spaced from said connecting conduit inner end and extending axially outwardly from said centrifuging chamber; and
   - a second discharge conduit communicating with said centrifuging chamber through said peripheral wall thereof in a direction with a component tangential to said centrifuging chamber to direct dispersant particles having dimensions exceeding a predetermined value through said second discharge conduit.

2. The apparatus of claim 1 including a plurality of said fluid feed conduits communicating with said swirl chamber through respective ports in said peripheral wall at angularly spaced positions.

3. The apparatus of claim 2 wherein said ports in said swirl chamber peripheral wall are at approximately the medial transverse plane of said swirl chamber.

4. The apparatus of claim 1, wherein said dispersant feed conduit communicated with said swirl chamber through a port in said first end wall substantially coaxial with said connecting and discharge conduits.

5. The apparatus of claim 1 wherein said swirl and centrifuging chamber are of circular transverse cross section.

6. The apparatus of claim 1 wherein said swirl chamber peripheral wall is cylindrical.

7. The apparatus of claim 1 wherein said centrifuging chamber peripheral wall tapers toward said discharge conduit.

8. The apparatus of claim 1 wherein said centrifuging chamber is of maximum increased diameter in a transverse plane at the level of the space between said connecting and discharge conduits.

9. The apparatus of claim 1 wherein said centrifuging chamber peripheral wall converges from an intermediate section thereof toward the opposite ends of said chamber.

10. The apparatus of claim 1 wherein at least one of said connecting and discharge conduits is axially adjustable relative to said centrifuging chamber.

11. The apparatus of claim 1 wherein said dispersant material feed conduit is of lesser diameter than said connecting conduit.

12. The apparatus of claim 1 wherein the end of said connecting conduit within said centrifuging chamber is outwardly flared.

13. The apparatus of claim 1 including a plurality of axially spaced coaxial centrifuging chambers in successive end-to-end communication through respective connecting conduits.

14. The apparatus of claim 13 wherein said connecting conduits are of successively greater diameter.

15. The apparatus of claim 1 including a source of fluid fuel and means connecting said fluid fuel source to said dispersant material feed conduit.

16. The apparatus of claim 15 including means connecting said second discharge conduit to said fuel source.

17. The apparatus of claim 1 including a blower having an outlet connected to said fluid feed conduit.

18. The apparatus of claim 1 including a blower having a suction inlet connected to said discharge conduit.

* * * * *